(12) United States Patent
Watson et al.

(10) Patent No.: US 7,549,849 B2
(45) Date of Patent: Jun. 23, 2009

(54) TANDEM MOTORS

(75) Inventors: Arthur I. Watson, Sugar Land, TX (US); Tyson R. Messick, Bartlesville, OK (US); Diego A. Narvaez, Missouri City, TX (US); Michael H. Du, Pearland, TX (US); Patrick M. McCartney, Bartlesville, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 517 days.

(21) Appl. No.: 11/306,606

(22) Filed: Jan. 4, 2006

(65) Prior Publication Data

US 2006/0222529 A1  Oct. 5, 2006

Related U.S. Application Data

(60) Provisional application No. 60/593,899, filed on Feb. 23, 2005.

(51) Int. Cl.
*F04B 35/04* (2006.01)

(52) U.S. Cl. ............... 417/414; 417/423.3; 417/423.14; 310/58; 310/87

(58) Field of Classification Search ................. 417/421, 417/424.1, 424.2, 423.3, 423.15, 423.14
See application file for complete search history.

(56) References Cited

U.S. PATENT DOCUMENTS

| | | | | |
|---|---|---|---|---|
| 2,569,741 A * | 10/1951 | Armais | ........................ | 310/87 |
| 2,783,400 A * | 2/1957 | Armais | ........................ | 310/87 |
| 2,814,253 A * | 11/1957 | Pleuger et al. | .............. | 417/388 |
| 3,468,572 A * | 9/1969 | Haent | .......................... | 403/337 |
| 3,785,753 A * | 1/1974 | Bogdanov et al. | ......... | 417/423.3 |
| 3,853,430 A * | 12/1974 | O'Rourke | .................... | 417/360 |
| 3,857,655 A * | 12/1974 | Tschirky | ....................... | 418/48 |
| 4,350,911 A * | 9/1982 | Wilson et al. | .................. | 310/87 |
| 4,927,386 A * | 5/1990 | Neuroth | ....................... | 439/589 |
| 4,992,689 A * | 2/1991 | Bookout | ....................... | 310/87 |
| 5,628,616 A | 5/1997 | Lee | | |
| 6,599,091 B2 | 7/2003 | Nagle | | |
| 6,602,059 B1 * | 8/2003 | Howell et al. | ............. | 417/423.3 |
| 6,607,044 B1 * | 8/2003 | Eppink et al. | .................. | 175/61 |
| 6,666,664 B2 * | 12/2003 | Gross | ........................ | 417/423.3 |
| 2003/0116323 A1 | 6/2003 | Pettigrew | | |
| 2005/0074330 A1 | 4/2005 | Watson et al. | | |
| 2005/0074331 A1 | 4/2005 | Watson | | |
| 2005/0109515 A1 | 5/2005 | Watson et al. | | |
| 2005/0199384 A1 | 9/2005 | Mack et al. | | |

\* cited by examiner

*Primary Examiner*—Devon C Kramer
*Assistant Examiner*—Amene S Bayou
(74) *Attorney, Agent, or Firm*—Kevin B. McGoff; James L. Kurka; Osha Liang

(57) ABSTRACT

A pumping system including a first section and a second section. The first section includes a first housing having an axial bore formed therethrough and a protruding member formed on one end of the first housing, and a first shaft arranged within the axial bore of the first housing. The second section include a second housing having an axial bore formed therethrough and a recess formed on one end of the second housing for receiving the protruding member of the first housing, and a second shaft arranged within the axial bore of the second housing. An apparatus for compensating oil volume change in a motor, including a compensator housing having an open end for connecting to the motor, and a closed end; and a flexible bladder arranged within the housing and connected to the open end of the housing.

19 Claims, 9 Drawing Sheets

TANDEM MOTORS

CROSS-REFERENCE TO RELATED APPLICATION

The present application claims priority of U.S. Provisional Patent Application Ser. No. 60/593,899 filed on Feb. 23, 2005. The Provisional Application is incorporated by reference in its entirety.

BACKGROUND OF INVENTION

1. Field of the Invention

The invention relates generally to connectors. In particular, embodiments relate to system and methods for tandem motor connections in a submersible pumping system for use in a wellbore.

2. Background Art

Pumping systems driven by motors are used to extract or move fluid and gas. In subsurface operations such as in a wellbore environment, typically submersible electric pumping systems are used in the production of hydrocarbon-based fluids. Unlike conventional motors in surface operations, a motor used in a submersible pumping system needs to be submersed in well fluids. The submersible motor is sealed from surrounding well fluids by a motor protector. The motor and the protector can be a combined section, as in a configuration disclosed in U.S. Patent Application Publication No. 20050109515.

The motor protector may also function to compensate for the motor oil volume change due to temperature and pressure changes during, for example, shipping the motor from a factory facility to an oil field, moving the motor from the surface to the wellbore, and turning on and off the pumping system.

A submersible pumping system in the prior art (U.S. Patent Application Publication No. 20050074331) is illustrated in FIG. 1. The pumping system 10 is located within a wellbore 12 in a geological formation 14 containing fluids such as oil. The wellbore 12 is protected with a casing 16 having perforations 18 through which fluids flow from formation 14 into the wellbore 12. The pumping system 10 includes a centrifugal pump 20 having an intake 22, a submersible motor 24 and a motor protector 26. The system 10 is suspended within the wellbore 12 by a deployment system 28. A power cable 30 provides electric power to the submersible motor 24. When pumping, wellbore fluids are introduced into the intake unit 22, and are passed into an intake on the centrifugal pump 20, and out to a tubing string for discharge to the earth's surface.

In FIG. 1, the pump section is located above the motor section. Other configurations of pumping systems also exist. For example, U.S. Patent Application Publication No. 20050199384 discloses shaft locking couplings for submersible pumping systems with a pump section located below a motor section.

A pumping system can include a plurality of stages connected together. For example, U.S. Patent Application Publication No. 20050074331 discloses an elongated pump with multiple pump stages in order to reduce compression force in each stage. In some operations, two submersible motors are connected together to form a "tandem motor" in order to provide a larger driving force for a pump than a single motor does. U.S. Patent Application Publication No. 20030116323 discloses multiple tandem motors mechanically connected to each other, but electrically independently connected to electrical power sources.

A tandem motor typically includes an "upper tandem motor" and a "lower tandem motor", wherein the "upper" and "lower" refer to the relative positions of the individual motors with reference to the pump. The two motors and/or protectors can be connected together using a protector-to-protector connection, a motor-to-motor connection, or a motor-to-protector connection. Different sections of a pumping system are typically connected together with bolts, as disclosed in U.S. Pat. No. 5,628,616.

A tandem motor is filled with motor oil for lubrication as in an individual motor. The tandem motor can be filled with oil in a factory before being shipped to an oil field. However, it is a challenge to ship a tandem motor without oil leaking out and air pockets being trapped in the motors due to temperature changes and vibrations. It is often desirable to ship the motors individually, and assemble them into a tandem motor at a well site. The process of filling a tandem motor with motor oil on a rig floor is very time consuming, and human errors during the procedure can leave air pockets trapped in the tandem motor and decrease the motor life span.

SUMMARY OF INVENTION

In one aspect, embodiments disclosed herein relate to a pumping system, comprising a first section and a second section. The first section comprises a first housing having an axial bore formed therethrough and a protruding member on one end of the first housing; and a first shaft arranged within the axial bore of the first housing. The second section comprises a second housing having an axial bore formed therethrough and a recess formed on one end of the second housing for receiving the protruding member of the first housing; and a second shaft arranged within the axial bore of the second housing.

In another aspect, embodiments disclosed herein relate to an apparatus for compensating oil volume change in a motor, comprising a compensator housing having an open end for connecting to the motor, and a closed end; and a bladder arranged within the housing and connected to the open end of the housing.

Other aspects and advantages of the invention will become apparent from the following description and the attached claims.

It is to be understood that the drawings are to be used for the purpose of illustration only, and not as a definition of the metes and bounds of the invention, or as a basis for reading non-existent or un-recited limitations into the claims.

DETAILED DESCRIPTION

In one aspect, some embodiments disclosed herein relate to methods and apparatus for shipping individual sections of a pumping system, such as a motor section, a protector section, or a motor-protector combined section, to a well site, and assembling the sections together into a tandem motor that is substantially free of air pockets trapped in the motor oil, without the need to re-fill the tandem motor with motor oil at the well site.

Figure 1:
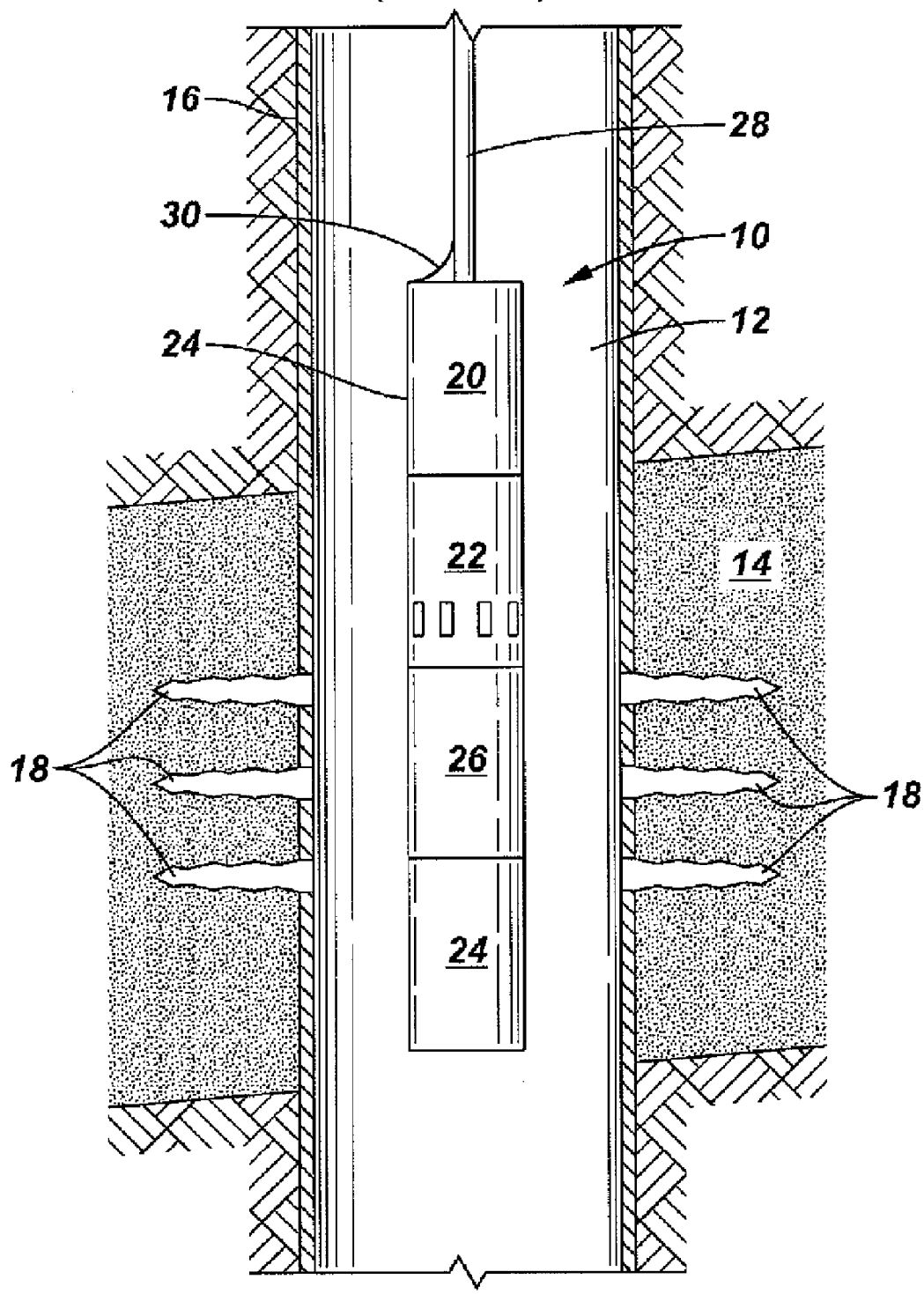
FIG. 1 shows a pumping system in the prior art.
Figure 2:
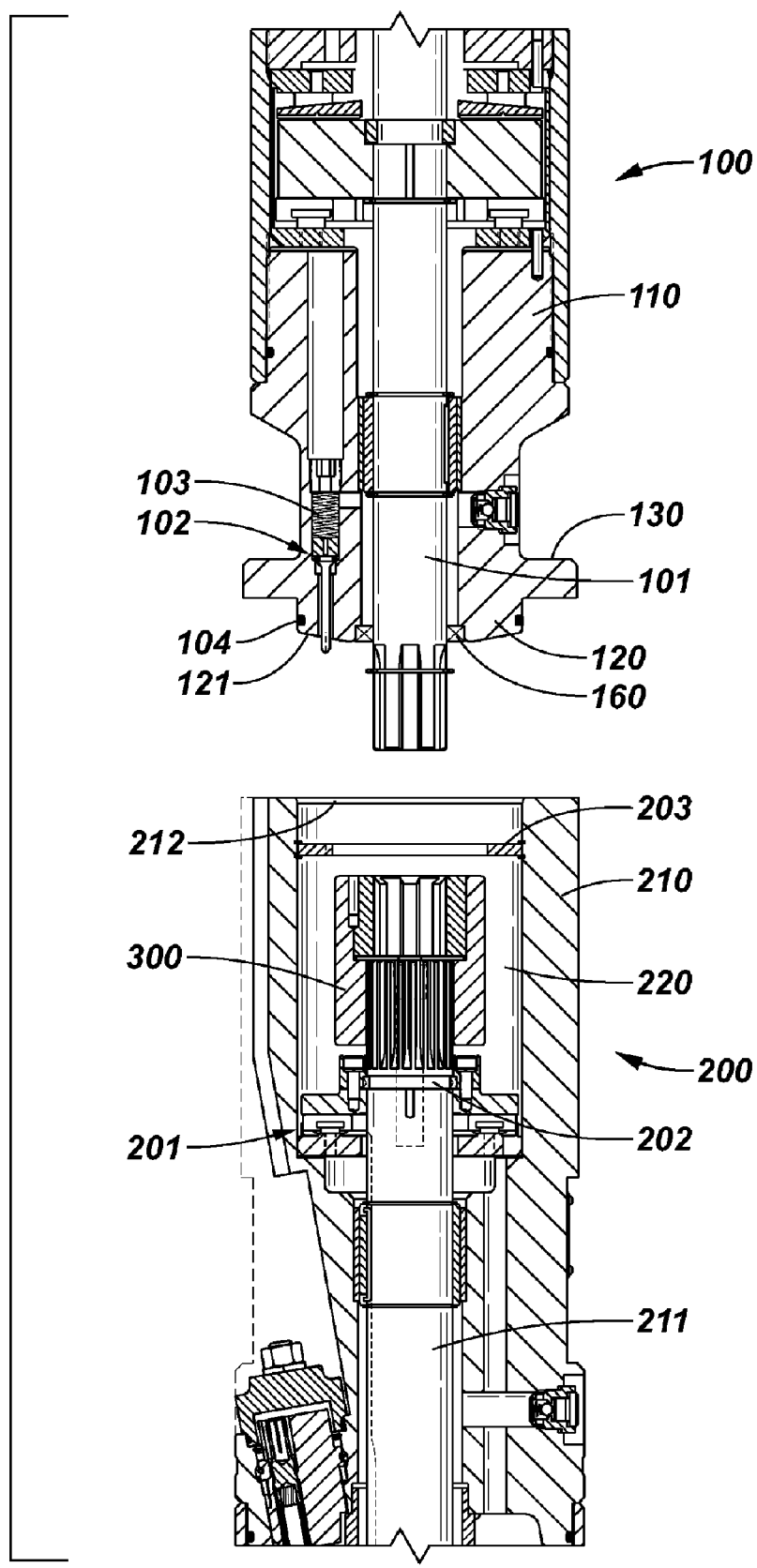
FIG. 2 is a partial cross-sectional view of an embodiment of a pumping system in accordance with the present invention with an upper protector base and a lower motor head before being connected. The lower motor head also comprises a shaft coupler.

A pumping system in accordance with embodiments of the present invention is illustrated in FIG. 2, where two sections of a pumping system are shown before being assembled. Referring to FIG. 2, a first section, which in accordance with one embodiment of the present invention is an upper motor protector base 100, and a second section, which in accordance with one embodiment of the present invention is a lower motor head 200, are aligned vertically before being connected together. The upper motor protector base 100 comprises a first housing 110, which has an axial bore formed therethrough to house an upper motor shaft 101. The lower motor head 200 comprises a second housing 210, which has an axial bore formed therethrough to house a lower motor shaft 211. The top of the lower motor head housing 210 forms a recess, which together with a shipping seal 212 form a cavity 220 in the lower motor head 200. Both the upper motor protector base 100 and the lower motor head 200 are pre-filled with motor oil.

A shaft lip seal 160 is installed to seal off the upper motor shaft 101, and prevents oil from leaking from cavities in the protector base 100 above the lip seal 160. The arrangement to have the lip seal 160 located at the lowest position in the first housing 110 maximizes the amount of oil retained in the upper motor section and reduces the chances to trap air pockets when the protector base 100 and the motor head 200 are connected together.

The bottom of the upper protector base 100 comprises a flange 130, a protruding member 120 with a slanted surface 121 to better vent the air out when the upper motor shaft 101 is submersed into the oil in the cavity 220 of the lower motor head 200. A communication valve 102, attached to a spring 103, is installed in the protector base 100. Before the upper protector base 100 and the lower motor head 200 are connected together, the communication valve 102 remains closed to hold oil inside the upper protector section. An O-ring 104 seals and retains oil in the lower motor section when the upper protector base 100 and the lower motor head 200 are connected. The lower motor head 200 comprises a motor thrust bearing 201, a shaft end 202, a shaft coupler 300, and an actuator 203 for the communication valve 102. The coupler 300 is completely submerged in the oil filling the cavity 220.

Figure 3:
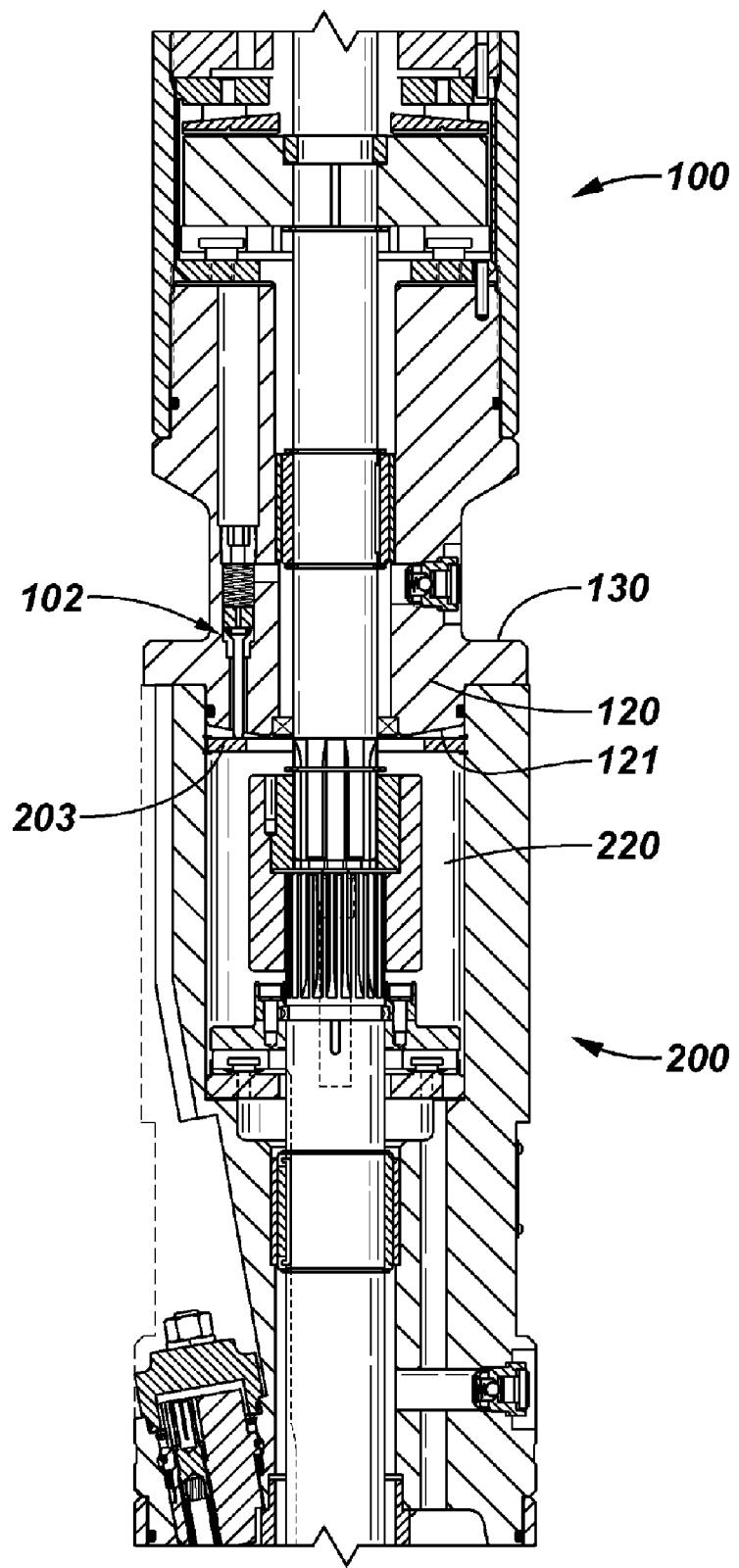
FIG. 3 is a cross-sectional view of the embodiment illustrated in FIG. 2 when the upper protector base and the lower motor head are connected together.

During the well site assembling procedures, the protector base 100 is lowered into the motor head 200, as shown in FIG. 3. While moving down, the protruding member 120 of the protector base 100 expels part of the motor oil out of the cavity 220 in the motor head 200. The slanted surface 121 on the protruding member 120 facilitates escape of air, minimizing trapped air. Therefore, the chance for air pockets being trapped between the protector base 100 and motor head 200 is minimized. Once the O-ring 104 is engaged with the motor head 200, the oil inside the cavity 220 will be trapped. Further engagement will displace oil either through the communication valve 102, or through the lip seal 160, depending on their respective relief pressures. The excess oil volume is then displaced out of the top end of the protector without causing damage to any components. As the joint is further engaged, the valve 102 will be positively opened by its contact with the valve actuator 203, while the spring 103 is compressed. Those of ordinary skill in the art will recognize that, the spring 103 may be replaced with any elastic element so long as it assists the closing and opening of the communication valve 102.

When the motor base flange 130 meets the motor head 200, the communication valve 102 will be completely open. The protector base 100 and the motor head 200 are then bolted together to complete the installation. A refilling process is not needed to fill up the tandem motor with oil.

In some applications, one section of the pumping system may need to have a plurality of protruding terminals, such as measurement terminals and electrical connections, attached to one end, resulting in an irregular surface. The irregular shape of the surface is more susceptible to forming air pockets in the motor oil, as compared with a surface with a regular shape especially a slanted surface. As described in the above descriptions of FIG. 2 and FIG. 3, one of the important features of some embodiments in accordance with the present invention is having a protruding member in the first section, and the protruding member displaces oil from the second section while driving out air bubbles. This mechanism can be applied to a section with an irregular surface by incorporating a bolt-on bulkhead plate that holds the protruding terminals, and the bulkhead plate fills most of the space between the protruding terminals.

Figure 4:
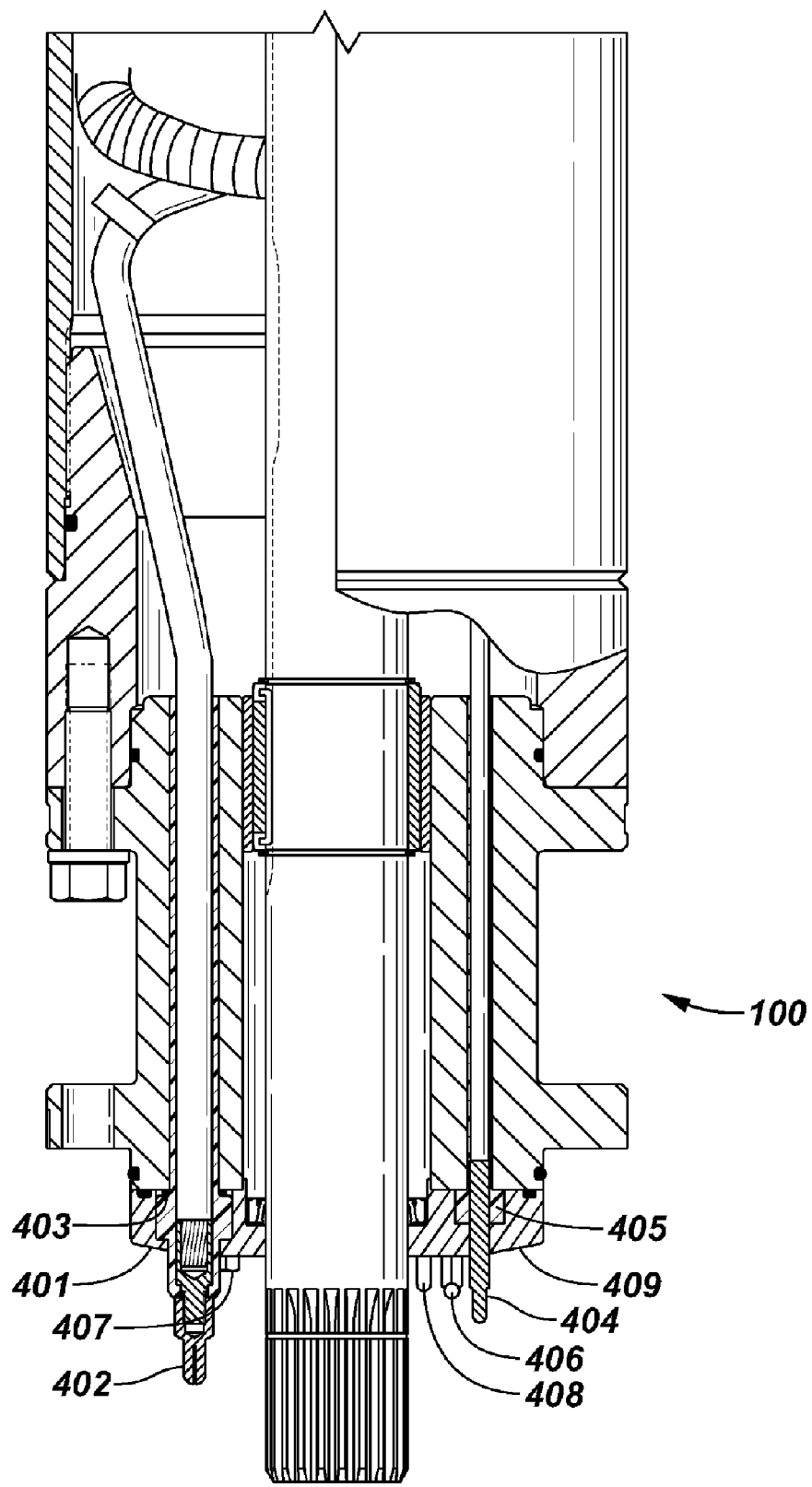
FIG. 4 shows a motor base with a bolt-on bulkhead plate in accordance with one embodiment of the present invention.

FIG. 4 shows an embodiment of a protector base 100, to which a bulkhead plate 401 is attached using at least one bolt 407. The bulkhead plate 401 is used to retain at least one protruding terminal, such as a communication valve 408, an electrical power terminal 402 sealed with a small O-ring 403, a gauge terminal 404 sealed with a rubber grommet 405, and a thermal couple 406. The bulkhead plate 401 fills up most of the space between the protruding terminals, making it easier for these protruding terminals to expel oil from a lower motor head when the upper protector base and the lower motor head are connected, leaving no air pockets in the oil. The bulkhead terminal 401 may also have a slanted surface 409 that facilitates expelling air when being immersed in the motor oil.

Figure 5:
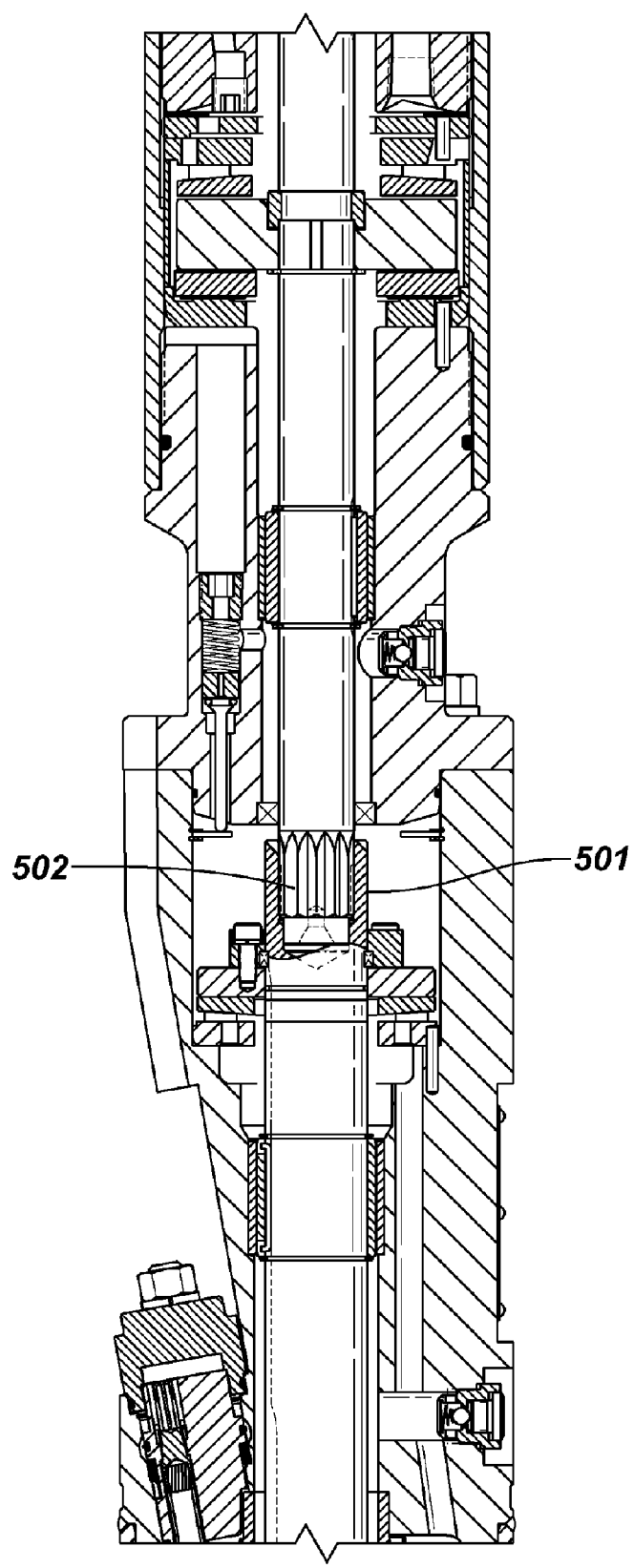
FIG. 5 shows a protector-motor connection without a shaft coupler in accordance with one embodiment of the present invention.

The method of making air-pocket-free connections can be applied to many different connections. For example, FIG. 5 shows another embodiment of a protector-motor connection, wherein the shaft coupler in FIG. 2 and FIG. 3 is not needed. In accordance with this embodiment, the lower motor shaft end terminates in a socket 501 with splines, and the socket 501 receives the upper protector shaft male splines 502. The installation procedure is the same as the procedure for the embodiments with a submerged shaft coupler, as illustrated in FIG. 2 and FIG. 3, and also keeps the connected sections substantially free of air pockets.

Figure 6A:
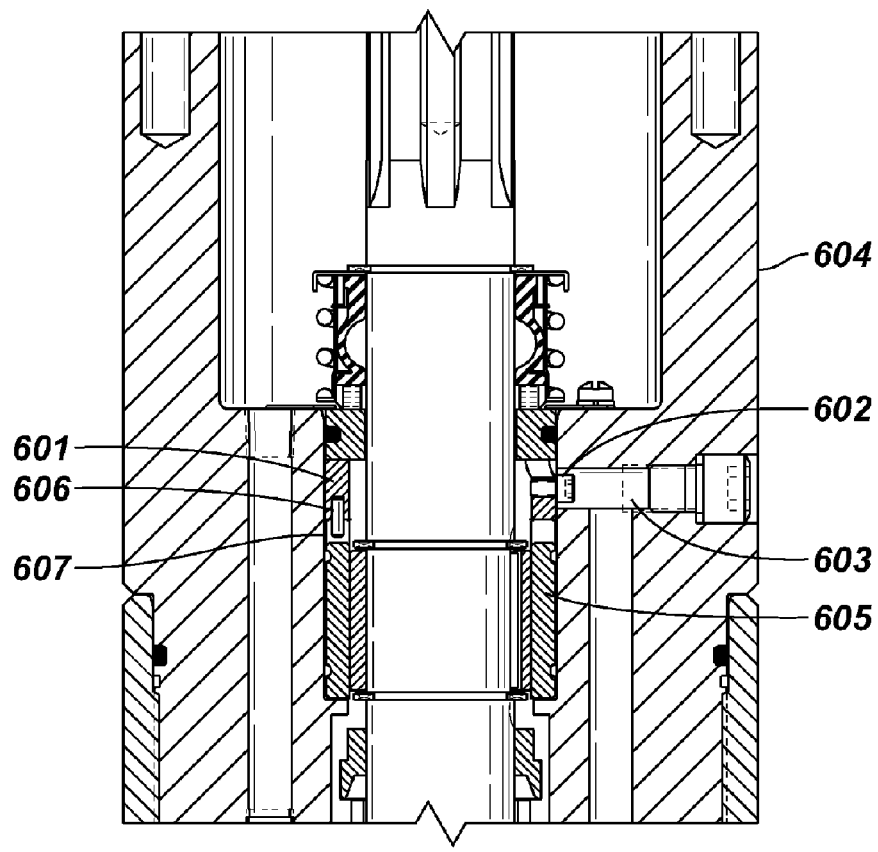
FIG. 6 shows a cross-sectional view and a perspective view of an anti-rotation ring in accordance with one embodiment of the present invention.
Figure 6B:
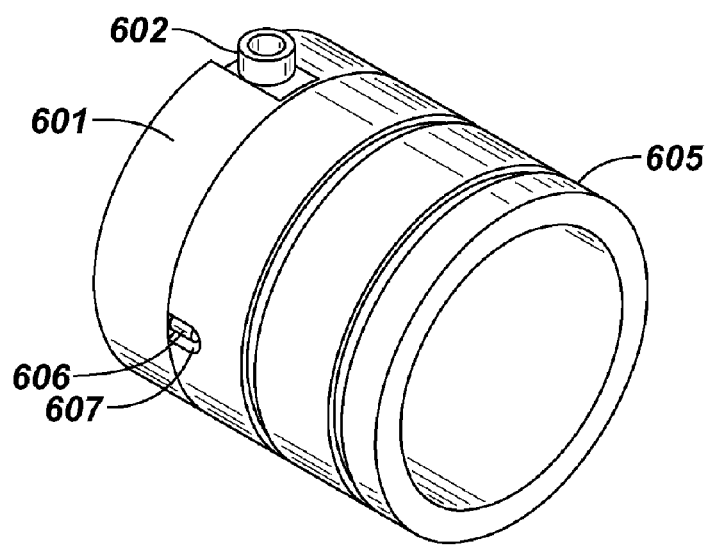

The motor head, the shaft and the protector base in the pumping system may have bearing points, where typically ceramic journal bearings are used. In accordance with one embodiment of the present invention, a specially designed anti-rotation ring 601, as shown in FIG. 6A and FIG. 6B, is used in conjunction with a ceramic journal bearing 605. The anti-rotation ring 601 has a radially installed screw 602 that extrudes into a recess or a hole 603 in the protector body 604, to keep the ring from rotating. The ring 601 in turn keeps the ceramic journal bearing 605 from rotating by extruding at least one axially installed pin 606 into a notch 607 in the bearing 605. Another function of the recess or hole 603 is for evacuation of air and introduction of oil during the process of filling the unit with oil. A recess in the upper end of the anti-rotation ring 601 and clearance between the OD of the screw 602 and the recess or hole 603 and a flat on the OD of the ring 601 provide a continuous communication path for this function.

Figure 7:
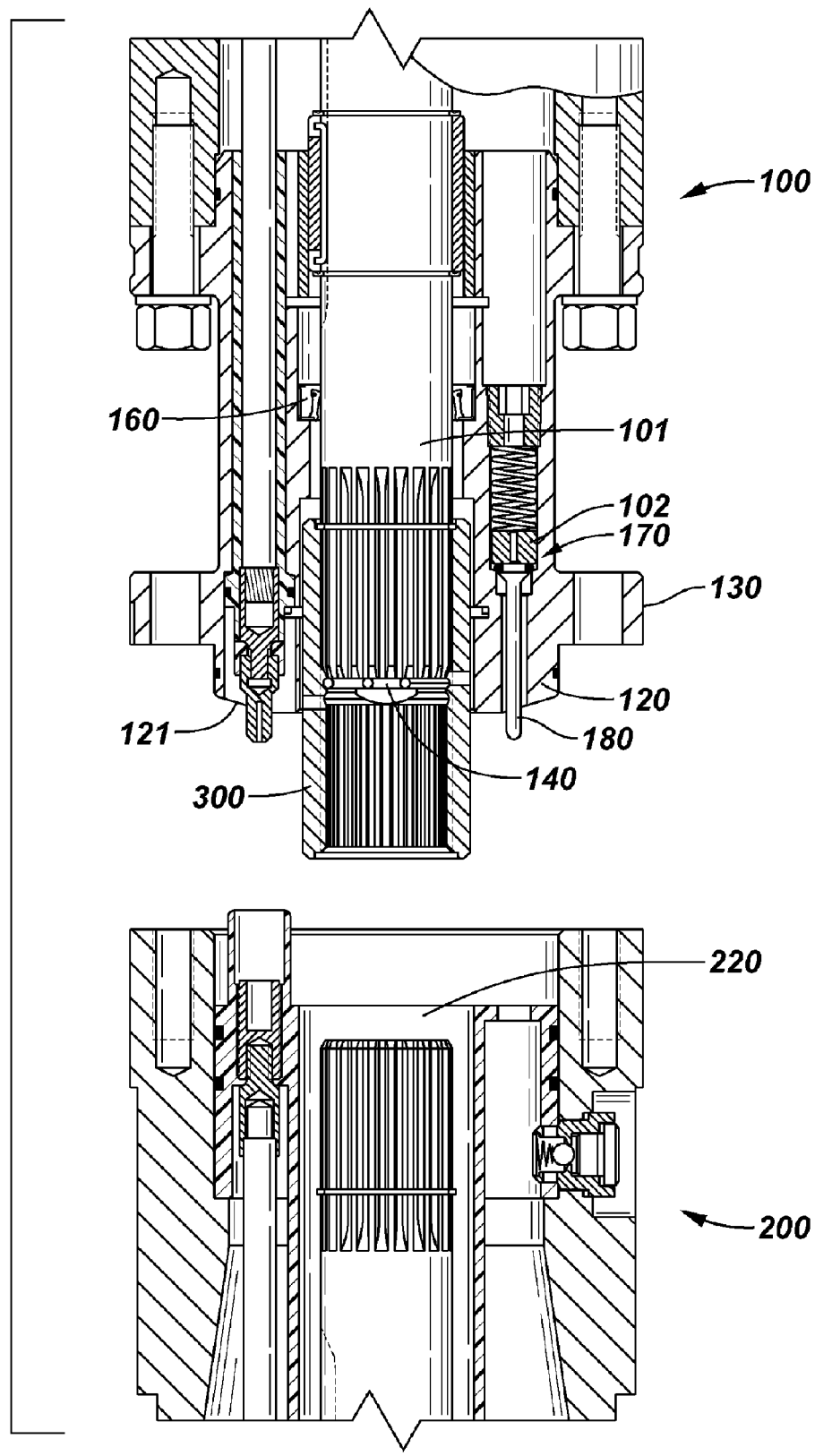
FIG. 7 is a partial cross-sectional view an embodiment in accordance with the present invention, wherein an upper protector base and a lower motor are not yet connected, wherein a shaft coupler is releasably attached to the upper motor shaft.
Figure 8:
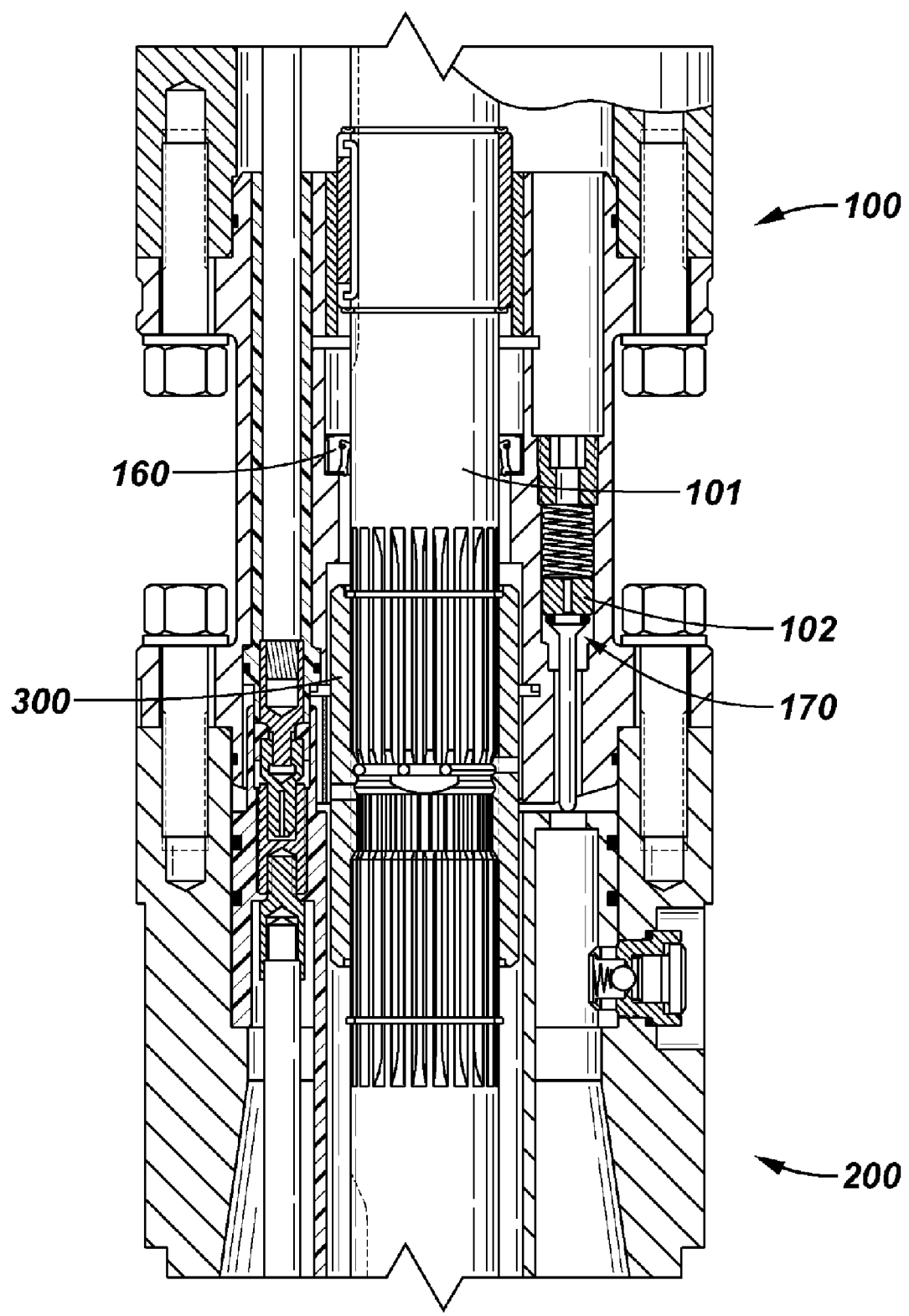
FIG. 8 is a cross-sectional view of the embodiment illustrated in FIG. 7 when the upper protector base and the lower motor head are connected together.

Yet another embodiment of an air-pocket-free connection in accordance with the present invention is illustrated in FIG. 7, wherein a shaft coupler 300 is attached to the upper motor shaft 101. In particular, a retaining clip 140 is used to removably attach the shaft coupler 300 to the upper motor shaft 101, to substantially reduce the void that would trap air during installation. The clip also allows the shaft coupler 300 to be removed and reinstalled manually. The upper tandem motor base 100 and the lower tandem motor head 200 are aligned vertically before being connected, similar to the embodiment illustrated in FIG. 2. The upper tandem motor base 100 also comprises components to minimize the amount of air that may otherwise be trapped when the upper tandem motor base 100 is connected with the lower tandem motor head 200. These components include a protruding member 120 with a slanted surface 121. The protruding member 120 extends beyond the flange 130 to fill most of the cavity 220 in the lower tandem motor head 200, which is pre-filled with oil before assembling, While assembling the tandem motor using the two sections illustrated in FIG. 7, the upper tandem motor base 100 is in contact with the lower tandem motor head 200, as shown in FIG. 8. The oil communication valve 102 allows the oil to flow in both directions, from the upper tandem motor to the lower tandem motor or from the lower tandem motor to the upper tandem motor. A number of sealing mechanisms, including an 0-ring 1 70 on the communication valve 102 and a lip seal 160 on the shaft 101, ensure that oil only flows through the communication valve 102 and does not leak out of the tandem motor connection. These sealing mechanisms also serve to retain as much oil as possible in the upper tandem motor base 100 before it is connected to the lower tandem motor head 200, leaving less chance for air pockets to be trapped when the two sections are connected. The protruding member 120 displaces oil from the cavity 220 in the lower tandem motor head 200 and thus does not allow air pockets to be trapped.

Figure 9:
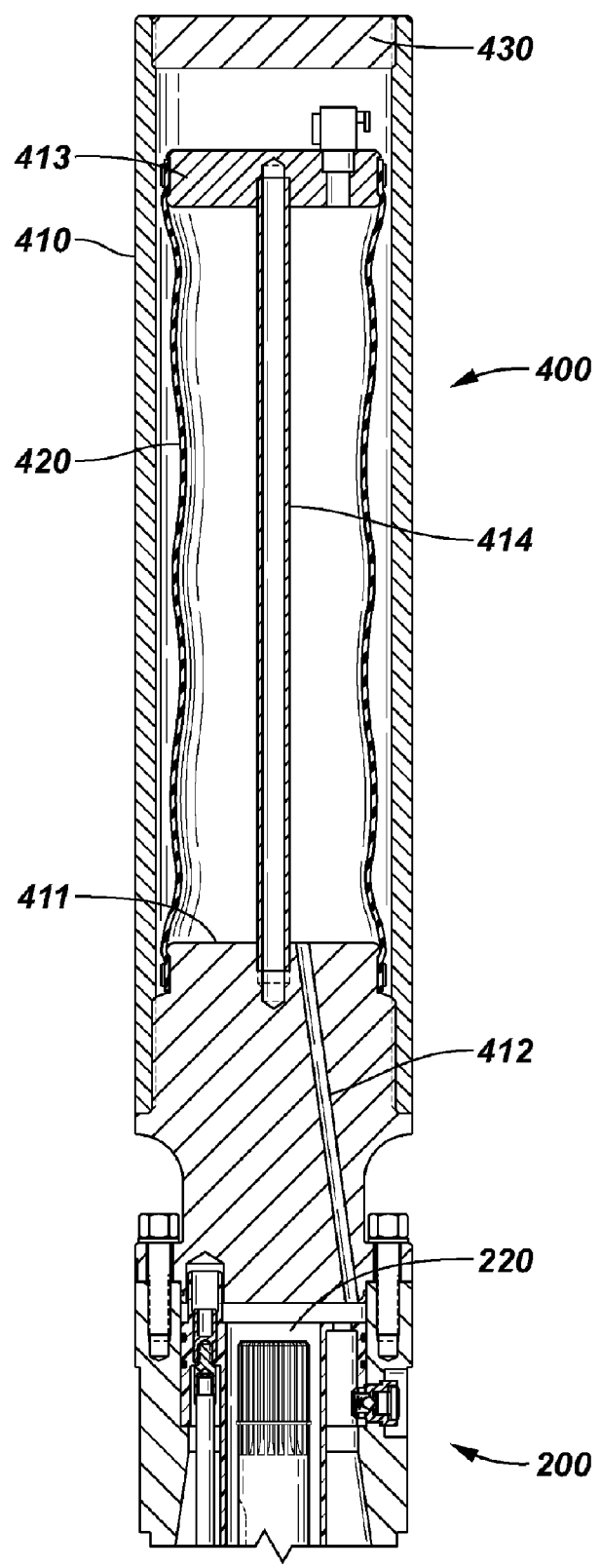
FIG. 9 illustrates a compensator in accordance with one embodiment of the present invention.

While sections of a pumping system can be easily connected at a well site, these sections preferably should be pre-filled with motor oil without air pockets trapped in them. It is also a challenge to transport these pre-filled, sealed sections, because motor oil changes in volume due to temperature changes during shipping. Such an oil volume change may result in oil leakage and air pockets formation in the oil. A shipping compensator 400 in accordance with one embodiment of the present invention is illustrated in FIG. 9, and is used to retain the motor oil in the lower tandem motor 200 during shipping. The shipping compensator 400 allows the motor oil to expand and contract due to temperature and/or pressure changes during shipping. The shipping compensator 400 comprises a housing 410 for holding a bladder 420, and the bladder 420 is connected to an open end 411 of the housing 410, wherein the open end 411 has a passage 412 connected to the cavity 220 in the motor head 200. The bladder 420 is fabricated from rubber or other flexible materials that can expand and contract. The passage 412 allows oil to flow from the lower motor head 200 to the bladder 420 when the oil expands in volume, and to flow from the bladder 420 to the lower motor head 200 when the oil contracts in volume. The bladder 420 is also connected to a bladder cap 413 supported by a rod 414. In accordance with some embodiments of the present invention, the bladder cap 413 can slid along the rod 414 to allow for a large oil volume change. The housing 410 may be sealed using a cap 430 to keep contaminant out. The housing 410 may be made of any sturdy materials, such as metal, plastic, rubber, or the like. In the embodiment illustrated in FIG. 9, the compensator 400 is directly connected to the motor head 200. In other embodiments of the invention, a compensator may be connected to a motor or a protector by means of a tube, and oil can flow through the tube between the compensator and the motor or protector.

While the above description uses a protector and a motor joint to illustrate embodiments of the invention related to air-pocket-free connections, one of ordinary skill in the art would appreciate that embodiments of the invention may also be applied to other air-pocket-free connections, such as protector-to-protector, motor-to-motor, or motor-to-gauge connections. The term "tandem motor" used in some embodiments in accordance with the present invention does not limit the tandem motor to have two motors or sections. Rather, the present invention applies to connections in a multi-section or multi-stage configuration of a motor, which may include a plurality sections of motors, protectors, and connectors. Furthermore, the terms "upper tandem motor" and "lower tandem motor" should not be interpreted as limiting the scope of the present invention to a vertically configured motor. Rather, the present invention may apply to motors or connections of any orientation or geometrical configurations.

Advantages of the present invention may include one or more of the following. Embodiments of the invention may provide simplified on-site assembling procedures for tandem motors and/or protectors, as sections of a tandem unit can be bolted together without leaving air pockets in the motor oil, thus a re-filling procedure is not needed. With a shipping compensator in accordance with embodiments of the invention, oil in the motor can expand and contract quite freely without leaking out, or pulling air in.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pumping system, comprising:
   a first section, comprising:
      a first housing having an axial bore formed therethrough and a protruding member formed on one end of the first housing; and
      a first shaft arranged within the axial bore of the first housing; and
   a second section, comprising:
      a second housing having an axial bore formed therethrough and a recess formed on one end of the second housing for receiving the protruding member of the first housing; and
      a second shaft arranged within the axial bore of the second housing,
   wherein the protruding member in the first section has a slanted surface on an end face thereof to minimize trapping air in an oil held in the recess in the second section when the first section and the second section are joined.

2. The pumping system of claim 1, wherein the first section is one selected from a motor and a motor protector, wherein the second section is one selected from a motor and a motor protector.

3. The pumping system of claim 2, wherein the first section and the second section are pre-filled with motor oil.

4. The pumping system of claim 1, further comprising a shaft coupler for coupling the first shaft and the second shaft.

5. The pumping system of claim 4, wherein the shaft coupler is arranged on the first shaft.

6. The pumping system of claim 5, wherein the shaft coupler is releasably attached to the first shaft by a retaining clip.

7. The pumping system of claim 1, further comprising a seal disposed on the first housing and adapted to engage the first shaft.

8. The pumping system of claim 7, wherein the seal is located proximate the lowest point of the first housing.

9. The pumping system of claim 1, further comprising a compensator connected to an end of the first or second section, wherein the compensator compensates for the oil volume change in the section to which the compensator is connected.

10. The pumping system of claim 9, wherein the compensator comprises:
   a compensator housing having an open end for connecting to the first or second section, a closed end, and an axial bore therethrough; and
   a flexible bladder arranged within the compensator housing and connected to the open end of the compensator housing.

11. The pumping system of claim 10, wherein the compensator is connected to the first or second section by a tube.

12. The pumping system of claim 1, wherein the first section further comprises a communication valve assisted by a spring or an elastic element.

13. The pumping system of claim 12, wherein the second section further comprises a valve actuator that opens the communication valve.

14. The pumping system of claim 1, wherein the protruding member in the first section comprises a bolt-on bulkhead plate in which at least one protruding element is installed.

15. The pumping system of claim 14, wherein the protruding element is at least one selected from an electrical terminal, a gauge terminal, a thermal couple, and a valve component.

16. The pumping system of claim 15, wherein the protruding terminal is sealed with a rubber grommet.

17. The pumping system of claim 1, wherein the first section further comprises an anti-rotation ring that is radially installed using a first anti-rotation element, wherein the first anti-rotation element protrudes into a recess in the first housing, wherein the anti-rotation ring has a second anti-rotation element that engages a bearing.

18. The pumping system of claim 17, wherein each of the first and the second anti-rotation elements is one selected from a screw, a pin, and a key.

19. The pumping system of claim 17, wherein the recess allows fluid to flow past the anti-rotation ring.

* * * * *